United States Patent [19]
Williams

[11] Patent Number: 5,132,194
[45] Date of Patent: Jul. 21, 1992

[54] BATTERY HOLDDOWN AND TERMINAL CONNECTOR

[76] Inventor: Fred G. Williams, P.O. Box 815, Stevensville, Md. 21666

[21] Appl. No.: 545,620

[22] Filed: Jun. 29, 1990

[51] Int. Cl.⁵ .............................................. H01M 2/30
[52] U.S. Cl. ...................................... 429/121; 429/181
[58] Field of Search ................. 429/121, 163, 65, 178, 429/181; 180/68.5

[56] References Cited
U.S. PATENT DOCUMENTS

| | | | |
|---|---|---|---|
| 1,266,814 | 5/1918 | Kammerhoff | 429/163 |
| 1,636,562 | 7/1927 | Hick | 180/68.5 |
| 1,993,893 | 3/1935 | Page | 429/121 |
| 2,621,222 | 12/1952 | Wirth | 429/121 |
| 4,760,000 | 7/1988 | Williams | 429/121 |

Primary Examiner—Anthony Skapars
Attorney, Agent, or Firm—John B. Dickman, III

[57] ABSTRACT

An assembly for facilitating the quick connection and disconnection of appliance cables to the terminals of a storage battery and preventing corrosion at the terminals, including a pair of connectors defined by insulating caps enclosing conductive sleeves, and a releasable clamp engageable with the battery for securing the connectors against their respective terminals, including the improvement of a simple releasable clamp.

8 Claims, 2 Drawing Sheets

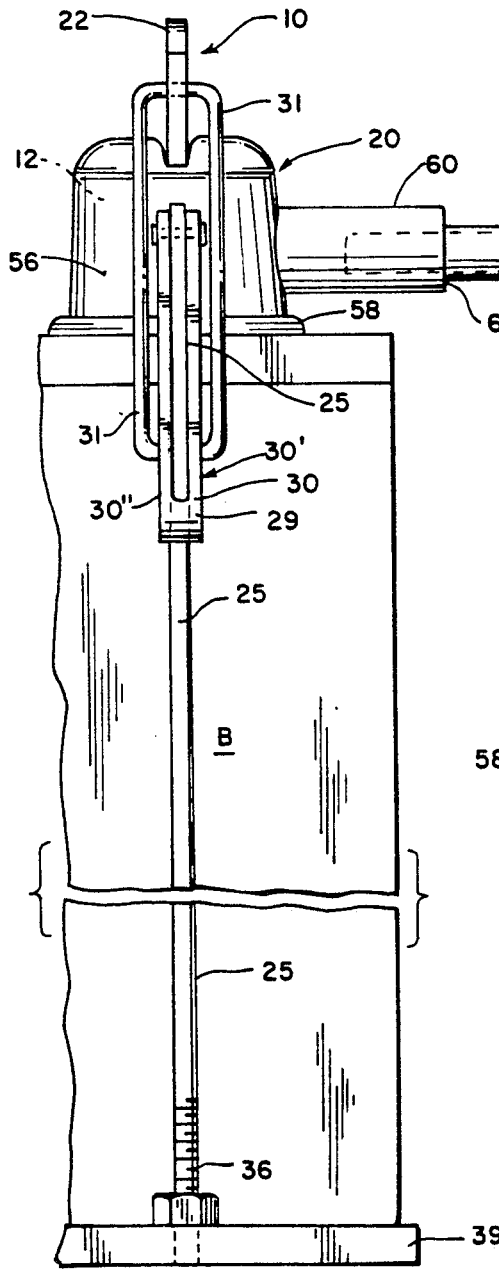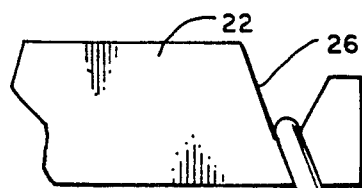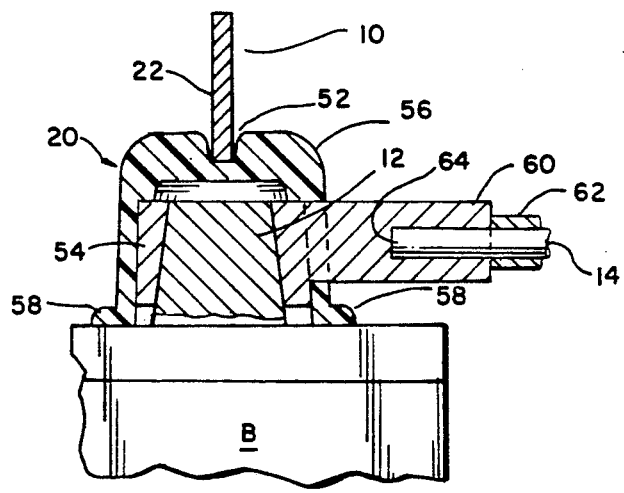

BATTERY HOLDDOWN AND TERMINAL CONNECTOR

BACKGROUND OF THE INVENTION

1. Field of the Invention

The present invention generally involves the field of technology pertaining to connecting electric cables to the terminals of a storage battery, and is an improvement over my prior patent, U.S. Pat. No. 4,760,000.

2. Description of the Prior Art

A conventional storage battery is provided with a pair of terminals or posts of opposite polarity for connection to the corresponding conductor cables of an electrical appliance, such as the starter motor of a vehicle. The terminals are of the type which protrude from the top of a storage battery. The cables are usually provided with a clamp at the end of each conductor cable which is tightened around the corresponding terminal of the battery. This arrangement has proven to be highly disadvantageous for two basic reasons. First, the attachment or removal of the clamps requires the use of a wrench and is time consuming, particularly, if the terminals of the battery are disposed at a position where the terminals are not readily accessible. Second, the terminals are subject to oxidation or corrosion, an undesirable situation which tends to shorten the effective life of the battery.

The prior art has recognized these disadvantages and has offered various solutions to overcome them. The patents cited in my prior U.S. Pat. No. 4,760,000 are the closest patents known to the inventor. Applicant is still the owner of said patent.

SUMMARY OF THE INVENTION

It is an object of the invention to provide an improved assembly for permitting the quick connection and disconnection of appliance cables to the terminals of a storage battery.

It is another object of the invention to provide an improved connector for connecting the end of an appliance cable to a terminal of a storage battery whereby corrosion at the terminal is eliminated.

It is a further object of the invention to provide an improved assembly for connecting and disconnecting appliance cables to the terminals of a storage battery wherein the assembly is adaptable to batteries having different spacings between terminals.

It is yet another object of the invention to provide an improved assembly for connecting and disconnecting appliance cables to the terminals of a storage battery wherein the assembly is of simple construction, economical manufacture and extremely durable for long term use.

These and other objects of the invention are realized by providing an assembly which essentially comprises a pair of connectors for attachment to the ends of corresponding appliance cables and a clamp for releasably securing the connectors to the corresponding terminals of a storage battery. Each connector is defined by a conductive metal sleeve for snug engagement around a battery terminal and an insulating cap which encloses the sleeve, the cap including a peripheral boot which sealingly engages against the surface of the battery for preventing oxidation or corrosion at the terminal connection. The attachment portion preferably includes a recess for receiving the end of an appliance cable which may be either permanently or detachably joined to the attachment portion. The clamp includes a rectangular beam which engages a correspondingly-shaped groove provided in the top of the insulating cap. A pair of threaded studs or bolts are adapted to pass through a base member and be threadedly adjustable at their lower ends to hold the device in the proper position. One of said studs has an overcenter latch pivotally mounted on the upper end thereof for adjustable locking of said linkage, beam and battery. The rectangular beam has a pivot at one end and a recess at its other end for engaging a portion of an overcenter latch for engaging the battery and the threaded studs for applying pressure for urging the beam into the corresponding grooves to secure the connectors against the terminals. The overcenter latch on the linkage engages and secures the linkage and applies tension to the latch. The latch also has a locking feature, whereby a separate key or permutation lock may be applied.

Other objects, features and advantages of the invention shall become apparent from the following detailed description of a preferred embodiment thereof when taken in conjunction with the drawings wherein like reference characters refer to corresponding parts.

BRIEF DESCRIPTION OF THE DRAWINGS

FIG. 3 is an enlarged fragmentary side elevational view as seen from the right of FIG. 2;

FIG. 4 is a fragmentary vertical sectional view, taken along the line 4—4 of FIG. 2;

FIG. 5 is a partial plan view of the overcenter latch means in a partially open position.

DESCRIPTION OF THE INVENTION

Figure 1:
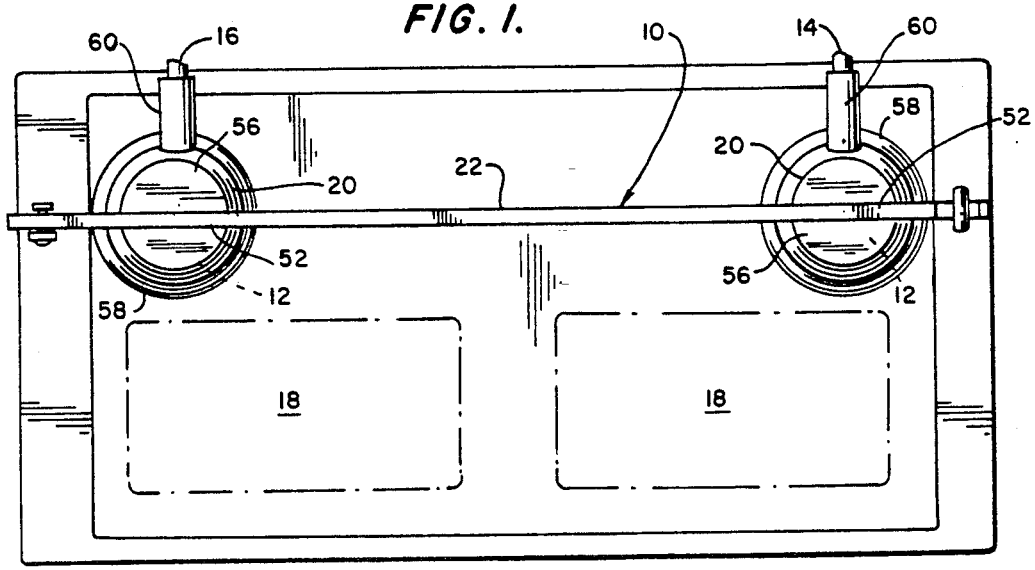
FIG. 1 is a plan view of a battery terminal assembly according to the preferred embodiment of the present invention.
Figure 2:
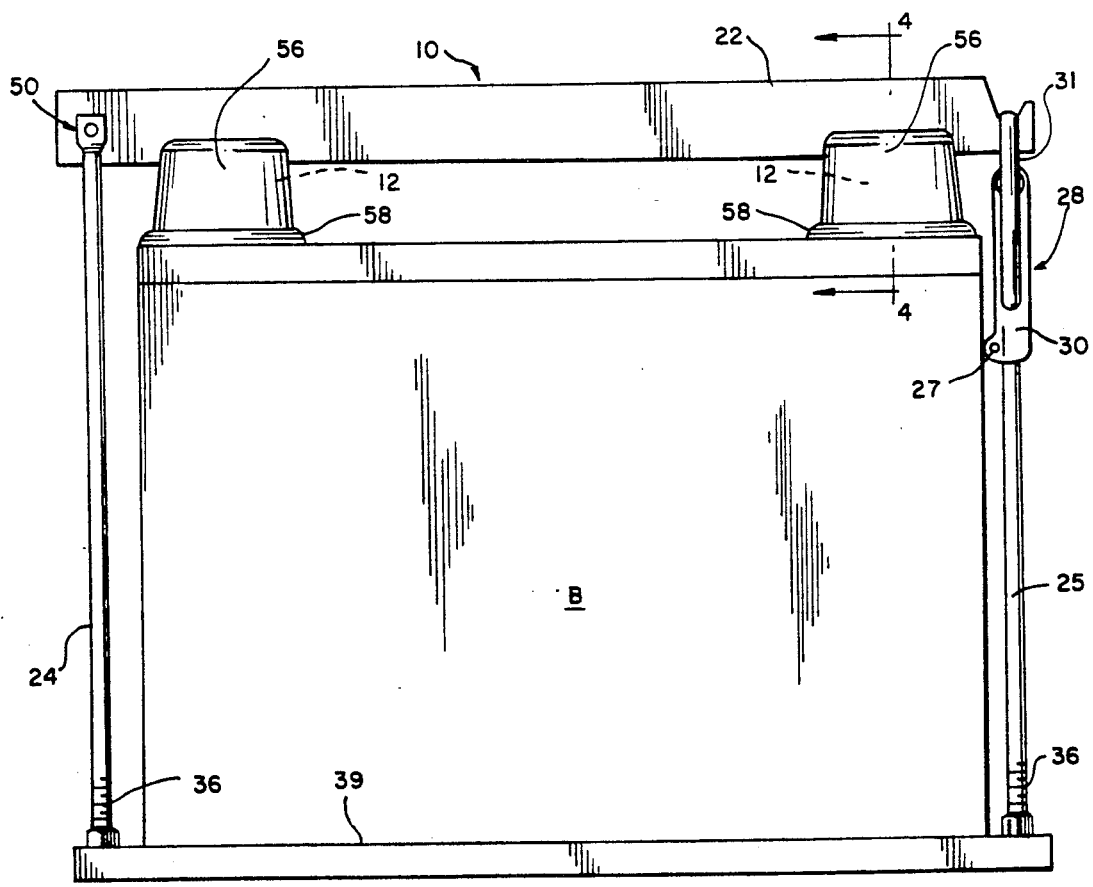
FIG. 2 is a front elevational view of the assembly of FIG. 1.

A battery terminal assembly 10, according to the invention, shall now be described with initial reference to FIGS. 1 and 2. As shown therein, assembly 10 is installed on a storage battery B provided with a pair of upstanding terminals or posts 12 which are in electrical contact with an appliance (not shown), such as the electrical system of a vehicle, through a pair of insulated conductor cables 14 and 16. Battery B may be of any conventional type well known in the art, such as a lead storage battery having terminal 12 of opposed polarity and a pair of closure caps, shown generally at 18, for permitting the individual cells to be replenished with water. Battery B may also be of the fully sealed, no maintenance type without closure caps 18 or equivalent means for permitting access to the individual cells.

Assembly 10 is essentially defined by a pair of connectors 20 and a clamp beam 22. Each connector 20 is configured for engagement around corresponding terminals 12 and its corresponding appliance cables 14 and 16. Connectors 20 are detachably secured to terminals 12 by beam 22 through adjustable studs 24 and 25, one of which is pivotally secured at its top end to one end of beam 22 and has at its other end means for connection to a battery support 39. Downward pressure is applied to the tops of connectors 20 by beam 22 through the actuation of an overcenter latch 28 forming a part of stud 25. Stud 24 is secured to beam 22 by a loose fitting rivet. The structure and function of latch 28 is conventional and well known in the art, with its basic function being the tensioning of stud 25 and securing same in a locked position until released through the pivoting of a handle 30 outwardly, as shown in FIGS. 2 and 5. A loop 31 is pivotally attached to handle 30 at its lower portion and removably engaged with recess 26 in beam 22 at its upper portion. Handle 30 comprises two spaced sideplates 30' and 30" held in spaced relation by pivotally engaging on their open ends a loop 33 formed on the upper end of stud 25 by means of pivot pin 37, and being integrally joined by web 29 on their lower ends, said web 29 having a bore 27 passing through said sideplates adjacent said web and adapted to encompass stud 25 and enable a desired locking means, (not shown) to lock said overcenter latch in closed position. The amount of downward pressure applied by beam 22 can be controlled by varying the amount of tension imparted by latch 28 to stud 25. This is accomplished by providing each of said studs 24 and 25 with a threaded portion 36, said portion being threadedly engaged to the battery seat by means of an upper and lower nut. Latch 28 is joined to the corresponding end of beam 22 by engaging recess 26 in said beam. Stud 24 is joined to one end of beam 22 by a pivot connection 50. Though stud 25 has been described with an overcenter latch 28 for the purpose of imparting tension thereto, it is understood that other mechanisms for accomplishing this same function may also be utilized so long as the purpose and intent of the invention as disclosed herein are realized.

The details of connectors 20 and the manner in which beam 22 secures same to terminals 12 shall now be described with particular reference to FIGS. 3 and 4. As depicted therein, beam 22 has a substantially rectangular transverse cross-sectional configuration. The lower edge of the beam 22 is engageable within a correspondingly shaped groove 52 provided at the top of connector 20. This is more clearly shown in FIG. 4. It is therefore apparent, that when downward pressure is applied by beam 22 through the actuation of studs 24 and 25, the engagement of beam 22 against connectors 20 is extremely secure and reliable. This eliminates the probability of connectors 20 accidentally shifting or becoming dislodged from terminals 12.

The details of connectors 20 shall now be described with specific reference to FIG. 4. Each connector 20 includes a conductive sleeve 54, preferably formed of lead or other suitable material, and configured for snug engagement around terminal 12. Sleeve 54 is enclosed by a cap 56 formed from an insulating material, preferably plastic, rubber or the like. Grooves 52 are formed in the tops of caps 56, and positioned such that the grooves are aligned when the connectors 20 are in position on terminals 12, therefore beam 22 can rest in the grooves. A peripheral boot 58 is provided at the bottom of cap 56 for sealing engagement against the top surface of battery B, thereby preventing oxidation or corrosion of terminal 12. Boot 58 is also formed from an insulating material, such as plastic or the like, an may be either separately attached to cap 56 or be integrally formed therewith. Sleeve 54 is provided with a conducting attachment portion 60, preferably integrally formed therewith and of the same material. Portion 60 extends laterally from sleeve 54 and outwardly of cap 56, and is provided with a recess 62 for receiving a bare metal end 64 of cable 14. It is preferred that end 64 be permanently fused or bonded to connector portion 60 through any procedure well known in the art for establishing a positive electrical connection therebetween. Cap 56 is also preferably fused or bonded to sleeve 54 in any manner well known in the art, such as through the utilization of a mold and pouring molten plastic or the like into the mold around sleeve 54 to form a bonded composite assembly. It is preferred that cap 56 be formed of vinyl plastic.

The application of assembly 10 to a battery shall now be described. Appliance cables 14 are first either permanently or detachably joined to attachment portions 60 of sleeves 54. Thereafter, connectors 20 are slipped onto their respective terminals 12 whereby the sleeve 54 of each connector 20 is snugly engaged around its corresponding terminal 12. Beam 22 is disposed within the corresponding grooves 52 of connectors 20. Hook portions may be formed on the bottom ends of studs 24 and 25 and can be engaged around the bottom of battery B. The overall length of the linkages may be adjusted by adjusting the threads on studs 36. Thereafter, latch 28 is then actuated by pressing handle 30 downwardly towards the sides of battery B to apply tension to linkages 24 and 25 and causing beam 22 to press downwardly against the tops of connectors 20, thereby effecting a positive electrical connection between terminals 12 and cables 14. The bore 27 then has a locking means applied thereto. Removal of connectors 20 is accomplished by reversing the procedure.

As is apparent, assembly 10 of this invention now permits the extremely quick connection and disconnection of appliance cables 14 to terminals 12 of battery B. More importantly, this procedure may be accomplished for batteries positioned in restricted spaces which are difficult to access when conventional cable connectors are utilized. Moreover, caps 56 and their associated boots 58 serve to insulate, sealingly enclose and protect terminal 12 from the atmosphere, thereby preventing oxidation or corrosion of same. The presence of attachment portion 60 extending outwardly of cap 56 permits jumper cable clamps or similar devices to be attached thereto and be placed in electrical connection with terminals 12 without the necessity of removing assembly 10 when it is desired to provide another appliance with current from battery B, such as in jump starting a vehicle.

It is to be understood that the forms of the invention herewith shown and described are to be taken as preferred examples of the same, and that various changes in the shape, size and arrangement of parts and compositions may be resorted to, without departing from the spirit of the invention or scope of the claims.

I claim:

1. A battery terminal assembly for detachably connecting electrical appliance cables to the terminals of a storage battery comprising:
   (a) a pair of connectors;
   (b) a releasable clamp for clamping the connectors to the terminal;
   (c) each connector including:
      i. a conductive sleeve configured for snug engagement around a terminal of the battery,
      ii. an insulating cap for enclosing the sleeve, the cap including a top portion for engagement by the clamp, and
      iii. a conductive attachment portion extending laterally from the sleeve and outwardly of the cap for connection to an appliance cable; and
   (d) the clamp includes:
      i. an elongated beam having a first end and a second end pivotally connected to a vertical stud member at said first end, where said elongated beam extends over said insulating caps, ii. said elongated beam having a recessed hook means at said second end to receive a quick release latch means, iii. said quick release latch means being mounted on a vertical stud member, and having an overcenter latch including a loop means, whereby said loop means engages said recessed hook means on said elongated beam to cooperate with said overcenter latch for applying downward pressure against the top portion of the cap for securing the connection to the terminal.

2. A battery terminal assembly as in claim 1, wherein said top portions of said caps include grooves to receive and hold said elongated beam, said grooves being aligned whereby downward pressure created by the pivoting of said elongated beam about the first end forces said connectors on the battery terminals and the closing of said overcenter latch provides downward pressure to said connectors to secure the connections.

3. A battery terminal assembly as in claim 2 wherein said vertical stud members are vertically adjustable on a battery support.

4. The assembly of claim 3 wherein said cap further includes a bottom portion and a peripheral boot extending from said bottom portion for sealingly engaging the battery and preventing corrosion at the terminal.

5. The assembly of claim 3 wherein said cap is formed of nonconductive plastic material.

6. The assembly of claim 3 wherein said attachment portion and said sleeve are integrally formed of lead.

7. The assembly of claim 3 wherein said attachment portion includes a recess for receiving the end of the appliance cable.

8. A battery terminal assembly as in claim 3 in which said overcenter latch has locking means integrally formed therewith.

* * * * *